J. W. Gardner,
Table Knife.
N° 27,357.   Patented Mar. 6, 1860.
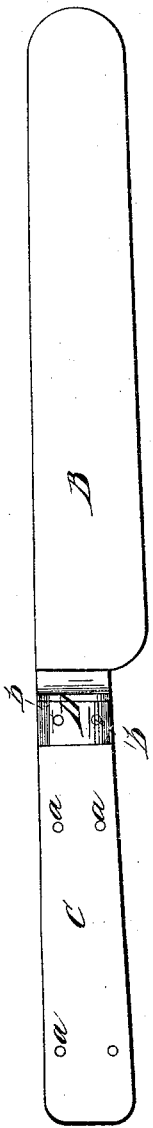 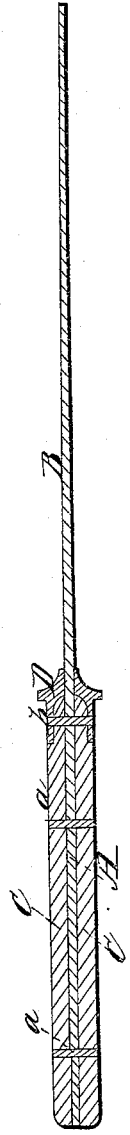  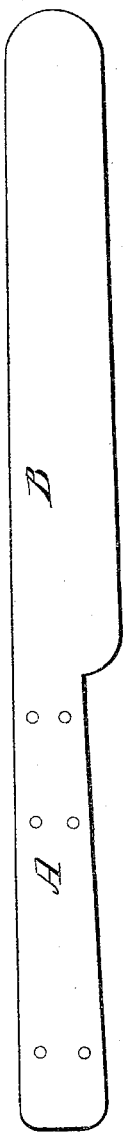
Witnesses:   Inventor:
Joseph W. Gardner

UNITED STATES PATENT OFFICE.

JOSEPH W. GARDNER, OF SHELBURNE FALLS, MASSACHUSETTS.

TABLE-CUTLERY.

Specification of Letters Patent No. 27,357, dated March 6, 1860.

*To all whom it may concern:*

Be it known that I, JOSEPH W. GARDNER, of Shelburne Falls, in the county of Franklin and State of Massachusetts, have invented a new and useful Improvement in the Manufacture of Table-Cutlery; and I do hereby declare the same to be fully described and represented in the following specification and the accompanying drawings, of which—

Figure 1, is a side view, and Fig. 2, a longitudinal section of a table knife constructed in accordance with my invention. Fig. 3, is a transverse section taken through the semibolsters. Fig. 4, is a side view of the shank and the blade separate from the scales and the semibolsters.

In carrying out my invention, whether in making either a knife or a fork, I construct the blade and the shank or part extending between the scales on into the handle of sheet metal or steel, the shank under such circumstances being flat and of a breadth nearly or quite equal to that of each of the scales. The said shank and blade I usually form from a sheet of steel by stamping them therefrom. In Fig. 4 the shank A and the blade B are exhibited as so made preparatory to having the scales and semibolsters applied to the shank.

The handle is composed of two pieces or thick plates of bone or other suitable material, they being technically termed "scales." They are shown at C C in the drawings and are applied flatwise on or to opposite sides of the flat shank A and secured thereto by rivets *a a* going through them and the shank. Furthermore, on the upper end of each of these scales there is a semibolster or cap D, which is made concavo-convex, rests against the shank and the handle and covers the upper part or end of the scale, as shown in the drawings. The two semibolsters are fastened in place against the shank, the lower end of the blade, and the upper part of the scales by means of rivets *b b*, extending through the shank, the scales, and the semibolsters, as shown in Figs. 2 and 3.

The advantages of my mode of making the knife are that by having its shank and blade made in one piece of sheet metal they can be made with less expense than when constructed with the round tapering shank applied to the blade by welding the two together; second, the semibolsters can be struck up or formed from sheet metal, and thus made cheaper than the ordinary single bolster to go entirely around the shank. Furthermore, as each semibolster covers and laps on the end or upper part of each scale (the scale entering it as a tenon usually enters a mortise) it prevents the scale from springing off the shank in lateral directions or from splitting at their upper ends, where they are most liable to do, in consequence of such being generally more exposed than other parts of the scale to water and moisture while the knife is being washed.

What I claim as my invention is—

An improved manufacture of knife or fork, as made not only with a flat or sheet metal shank and with the scales applied on opposite sides thereof, but with two separate semibolsters applied relatively to the shank and the scales and fastened thereto substantially as hereinbefore specified.

JOSEPH W. GARDNER.

Witnesses:
 FREDERIC A. BALL,
 WM. S. HEATH.